US011877373B2

(12) United States Patent
Choi et al.

(10) Patent No.: US 11,877,373 B2
(45) Date of Patent: Jan. 16, 2024

(54) COOKING APPARATUS AND CONTROL METHOD THEREOF

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Ji Woong Choi, Suwon-si (KR); Sang Min Park, Suwon-si (KR); Byoung Kuk Lee, Suwon-si (KR); Eun Soo Jang, Suwon-si (KR); Dong Myoung Joo, Suwon-si (KR); Hong-Joo Kang, Suwon-si (KR); Nam Ju Park, Suwon-si (KR); Chang Sun Yun, Suwon-si (KR); Hyun Kwan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 548 days.

(21) Appl. No.: 17/057,979

(22) PCT Filed: May 24, 2019

(86) PCT No.: PCT/KR2019/006273
§ 371 (c)(1),
(2) Date: Nov. 23, 2020

(87) PCT Pub. No.: WO2019/226019
PCT Pub. Date: Nov. 28, 2019

(65) Prior Publication Data

US 2021/0267024 A1 Aug. 26, 2021

(30) Foreign Application Priority Data

May 25, 2018 (KR) ........................ 10-2018-0059579

(51) Int. Cl.
*H05B 6/08* (2006.01)
*H05B 6/12* (2006.01)

(52) U.S. Cl.
CPC ............. *H05B 6/08* (2013.01); *H05B 6/1209* (2013.01); *H05B 2213/05* (2013.01); *H05B 2213/07* (2013.01)

(58) Field of Classification Search
CPC ........................ H05B 2213/05; H05B 2213/07; H05B 6/062; H05B 6/08; H05B 6/1209; E01C 19/002; E01C 23/065
(Continued)

(56) References Cited

U.S. PATENT DOCUMENTS 6,812,440 B2 * 11/2004 Hirota ...................... H05B 6/04 219/664

FOREIGN PATENT DOCUMENTS

JP 2005142097 A * 6/2005
JP 2008-108601 A 5/2008
(Continued)

OTHER PUBLICATIONS

International Search Report dated Sep. 24, 2019, in corresponding International Patent Application No. PCT/KR2019/006273.
(Continued)

*Primary Examiner* — Quang T Van
(74) *Attorney, Agent, or Firm* — STAAS & HALSEY LLP

(57) ABSTRACT

A cooking apparatus and a control method thereof, and more particularly, technology for determining the type of vessel placed in the cooking apparatus and controlling power in response to a state change of the placed vessel or a temperature change of a coil. In accordance with one aspect, a cooking apparatus includes: a coil on which a vessel is placed, configured to form a magnetic field upon application
(Continued)

of a current; a detection sensor configured to detect a magnitude of an input current applied differently according to a type of the vessel and a magnitude of an input voltage of the cooking apparatus; and a controller configured to determine a type of the placed vessel according to a power value calculated based on the detected input current and input voltage, and to determine a heating mode of the cooking apparatus based on the determined type of vessel.

13 Claims, 13 Drawing Sheets

(58) Field of Classification Search
USPC ....... 219/620, 612, 622, 623, 624, 625, 626, 219/627, 661, 662, 663, 664, 665, 666, 219/667, 668, 518; 99/325, DIG. 14; 363/74, 95
See application file for complete search history.

(56) References Cited

FOREIGN PATENT DOCUMENTS

| | | | |
|---|---|---|---|
| JP | 2014-220108 | A | 11/2014 |
| JP | 2016-42431 | A | 3/2016 |
| KR | 10-2016-0146376 | A | 12/2016 |
| KR | 10-1832211 | B1 | 2/2018 |
| KR | K101860490 | B1 * | 5/2018 |

OTHER PUBLICATIONS

Office Action dated Aug. 18, 2022, issued in Korean Application No. 10-2018-0059579.

* cited by examiner

COOKING APPARATUS AND CONTROL METHOD THEREOF

CROSS-REFERENCE TO RELATED APPLICATIONS

This application is a U.S. National Stage Application which claims the benefit under 35 U.S.C. § 371 of International Patent Application No. PCT/KR2019/006273 filed on May 24, 2019, which claims foreign priority benefit under 35 U.S.C. § 119 of Korean Patent Application 10-2018-0059579 filed on May 25, 2018, in the Korean Intellectual Property Office, the contents of both of which are incorporated herein by reference.

TECHNICAL FIELD

The present disclosure relates to a cooking apparatus and a control method thereof, and more particularly, to a technology for determining the type of vessel placed in the cooking apparatus and controlling power in response to a state change of the placed vessel or a temperature change of a coil.

BACKGROUND ART

Generally, an induction heating cooking apparatus is a cooking appliance for heating a cooking vessel using the principle of induction heating. The induction heating cooking apparatus includes a cooking plate on which the cooking vessel is placed, and an induction heating coil to generate a magnetic field when a current is applied thereto.

If the current is applied to the induction heating coil to generate the magnetic field, a secondary current is induced to the cooking vessel, and Joule heat is generated due to resistance components of the cooking vessel. Accordingly, the cooking vessel is heated by the Joule heat so that food contained in the cooking vessel is cooked.

The induction heating cooking apparatus has some advantages in that the cooking vessel can be more rapidly heated than a case with a gas range or a kerosene cooking stove in which a fossil fuel such as gas or oil is burned to heat a cooking vessel using combustion heat and a harmful gas is not generated and there is no risk of fire.

Regardless of the type of vessel, the induction heating cooking apparatus varies the heating mode according to the type of vessel so that it can be heated by the induction heating cooking apparatus. In recent years, research on a technology for determining the type of vessel placed in a cooking apparatus and controlling power in response to a change in a placed vessel or a temperature change of a coil has been actively conducted.

DISCLOSURE

Technical Problem

Therefore, it is an aspect of the disclosure to provide a cooking apparatus that implements a power control algorithm that quickly determines the type of vessel placed on the cooking apparatus, and having a fast response in response to changes in the state of the placed vessel or changes in coil temperature.

Technical Solution

In accordance with one aspect of the disclosure, a cooking apparatus includes: a coil on which a vessel is placed, configured to form a magnetic field upon application of a current; a detection sensor configured to detect a magnitude of an input current applied differently according to a type of the vessel and a magnitude of an input voltage of the cooking apparatus; and a controller configured to determine a type of the placed vessel according to a power value calculated based on the detected input current and input voltage, and to determine a heating mode of the cooking apparatus based on the determined type of vessel.

The controller may be configured to determine a type of the placed vessel by comparing the calculated power value with a predetermined power value within a predetermined frequency range of the cooking apparatus.

The type of the placed vessel may include a ferromagnetic vessel, a non-ferromagnetic vessel, or a non-heatable vessel, and the controller may be configured to determine a type of the placed vessel as the ferromagnetic vessel in response to the calculated power value being greater than or equal to a first reference power value in a first section of the predetermined frequency range, determine a type of the placed vessel as the non-ferromagnetic vessel in response to the calculated power value being greater than or equal to the second reference power value and less than the first reference power value in a second section of the predetermined frequency range, and determine a type of the placed vessel as the non-heatable vessel in response to the calculated power value being the third reference power value within the predetermined frequency range.

The controller may b configured to determine a heating mode of the cooking apparatus as a first mode in response to the type of the placed vessel being the non-ferromagnetic vessel, and determine a heating mode of the cooking apparatus as a second mode in response to the type of the placed vessel being the ferromagnetic vessel.

The cooking apparatus may further include: a relay switch, and the controller is configured to control the relay switch to be maintained in a turn-off state in response to the heating mode of the cooking apparatus being the first mode, and control the relay switch to be turned on in response to the heating mode of the cooking apparatus being the second mode.

In accordance with another aspect of the disclosure, a cooking apparatus includes: a coil on which a vessel is placed, configured to form a magnetic field upon application of a current; a temperature sensor configured to detect a temperature of the coil; a storage configured to store a preset power limit value according to the output power of each frequency of the cooking apparatus in response to heating the placed vessel; and a controller configured to reset a heating operation of the cooking apparatus in response to the output power of the cooking apparatus, which is changed as the state of the vessel changes, reaching the preset power limit value.

The controller may be configured to reset the heating operation of the cooking apparatus in response to the output power of the cooking apparatus, which is changed by deviating from the position where the vessel is placed, by changing the type of the vessel, or by inserting a foreign substance between the vessel and the coil, reaching the preset power limit value.

The storage may be configured to store a preset power limit value corresponding to the output power curve of each frequency of the cooking apparatus, and store the power limit value that increases based on the power curve as the frequency of the cooking apparatus decreases.

The temperature sensor may be configured to detect the temperature of the coil that changes as the placed vessel is heated.

The storage may be configured to store the power limit value of the cooking apparatus that varies according to the temperature of the coil.

The cooking apparatus according to claim 10, wherein the controller is configured to reset the heating operation of the cooking apparatus in response to the output power of the cooking apparatus, which is changed as the state of the vessel changes, reaching the stored power limit value, based on the power limit value of the cooking apparatus that varies according to the temperature of the coil.

The controller may be configured to cut off the power of the cooking apparatus to reset the heating operation of the cooking apparatus and determine a type of the vessel in response to the output power of the cooking apparatus, which is changed as the state of the vessel changes, reaching the preset power limit value.

In accordance with another aspect of the disclosure, a control method of a cooking apparatus on which a vessel is placed includes: detecting a magnitude of an input current applied differently according to a type of the vessel and a magnitude of an input voltage of the cooking apparatus; determining a type of the placed vessel according to a power value calculated based on the detected input current and input voltage; and determining a heating mode of the cooking apparatus based on the determined type of vessel.

The determining the type of the placed vessel may include: determining a type of the placed vessel by comparing the calculated power value with a predetermined power value within a predetermined frequency range of the cooking apparatus.

The type of the placed vessel may include a ferromagnetic vessel, a non-ferromagnetic vessel, or a non-heatable vessel, and the determining the type of the placed vessel may include: determining a type of the placed vessel as the ferromagnetic vessel in response to the calculated power value being greater than or equal to a first reference power value in a first section of the predetermined frequency range; determining a type of the placed vessel as the non-ferromagnetic vessel in response to the calculated power value being greater than or equal to the second reference power value and less than the first reference power value in a second section of the predetermined frequency range; and determining a type of the placed vessel as the non-heatable vessel in response to the calculated power value being the third reference power value within the predetermined frequency range.

The determining the heating mode of the cooking apparatus may include: determining a heating mode of the cooking apparatus as a first mode in response to the type of the placed vessel being the non-ferromagnetic vessel; and determining a heating mode of the cooking apparatus as a second mode in response to the type of the placed vessel being the ferromagnetic vessel.

The control method may further include: controlling the relay switch to be maintained in a turn-off state in response to the heating mode of the cooking apparatus being the first mode; and controlling the relay switch to be turned on in response to the heating mode of the cooking apparatus being the second mode.

In accordance with another aspect of the disclosure, a control method of a cooking apparatus including a coil on which a vessel is placed, configured to form a magnetic field upon application of a current includes: storing a preset power limit value according to the output power of each frequency of the cooking apparatus in response to heating the placed vessel; and resetting a heating operation of the cooking apparatus in response to the output power of the cooking apparatus, which is changed as the state of the vessel changes, reaching the preset power limit value.

The resetting the heating operation of the cooking apparatus may include: resetting the heating operation of the cooking apparatus in response to the output power of the cooking apparatus, which is changed by deviating from the position where the vessel is placed, by changing the type of the vessel, or by inserting a foreign substance between the vessel and the coil, reaching the preset power limit value.

The storing the preset power limit value may include: storing a preset power limit value corresponding to the output power curve of each frequency of the cooking apparatus; and storing the power limit value that increases based on the power curve as the frequency of the cooking apparatus decreases.

The control method may further include detecting a temperature of the coil; and detecting a temperature of the coil that changes as the placed vessel is heated.

The control method may further include storing the power limit value of the cooking apparatus that varies according to the temperature of the coil.

The resetting the heating operation of the cooking apparatus may include: resetting the heating operation of the cooking apparatus in response to the output power of the cooking apparatus, which is changed as the state of the vessel changes, reaching the stored power limit value, based on the power limit value of the cooking apparatus that varies according to the temperature of the coil.

The resetting the heating operation of the cooking apparatus may include: cutting off the power of the cooking apparatus and determining a type of the vessel in response to the output power of the cooking apparatus, which is changed as the state of the vessel changes, reaching the preset power limit value.

Advantageous Effects

According to the disclosed embodiment, it is possible to quickly determine the type of vessel placed on the cooking apparatus, and to implement a power control algorithm having fast response in response to a change in a state of a placed vessel or a change in a temperature of a coil.

MODE OF THE INVENTION

Figure 1:
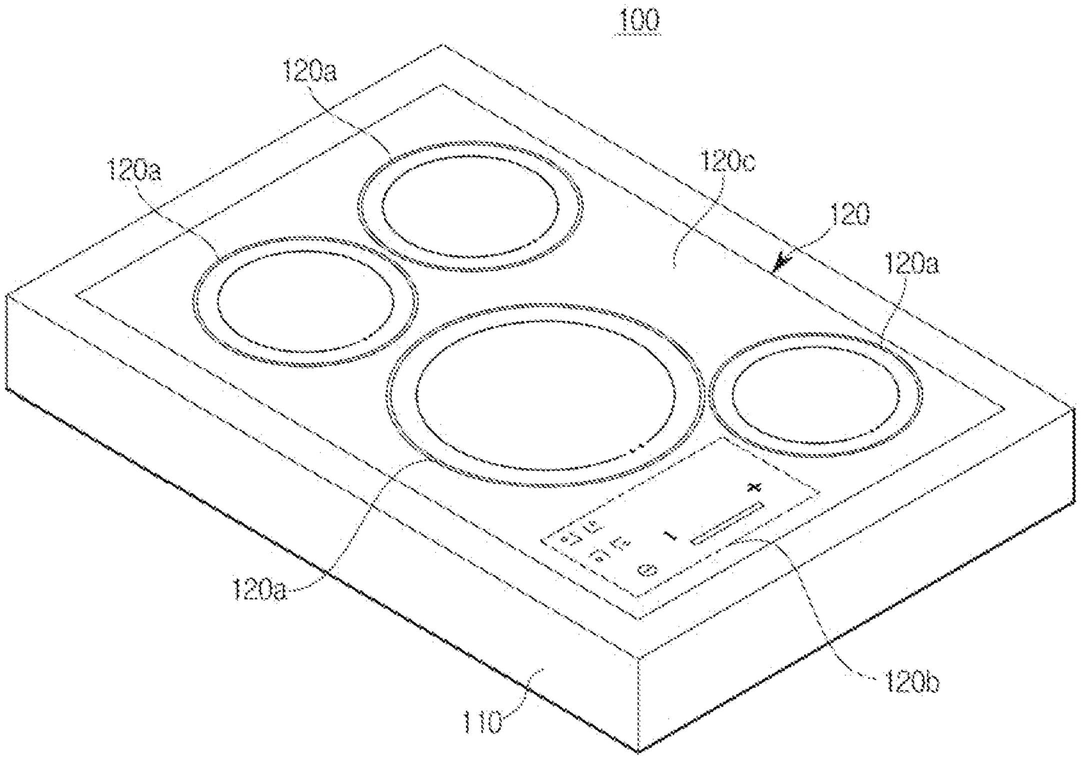
FIG. 1 is an external view of a cooking apparatus according to an embodiment.

Hereinafter, embodiments of the present disclosure will be described in detail with reference to the accompanying drawings.

Like reference numerals refer to like elements throughout the specification. Not all elements of embodiments of the present disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, operation principles and embodiments of the present disclosure will be described with reference to the accompanying drawings.

Figure 2:
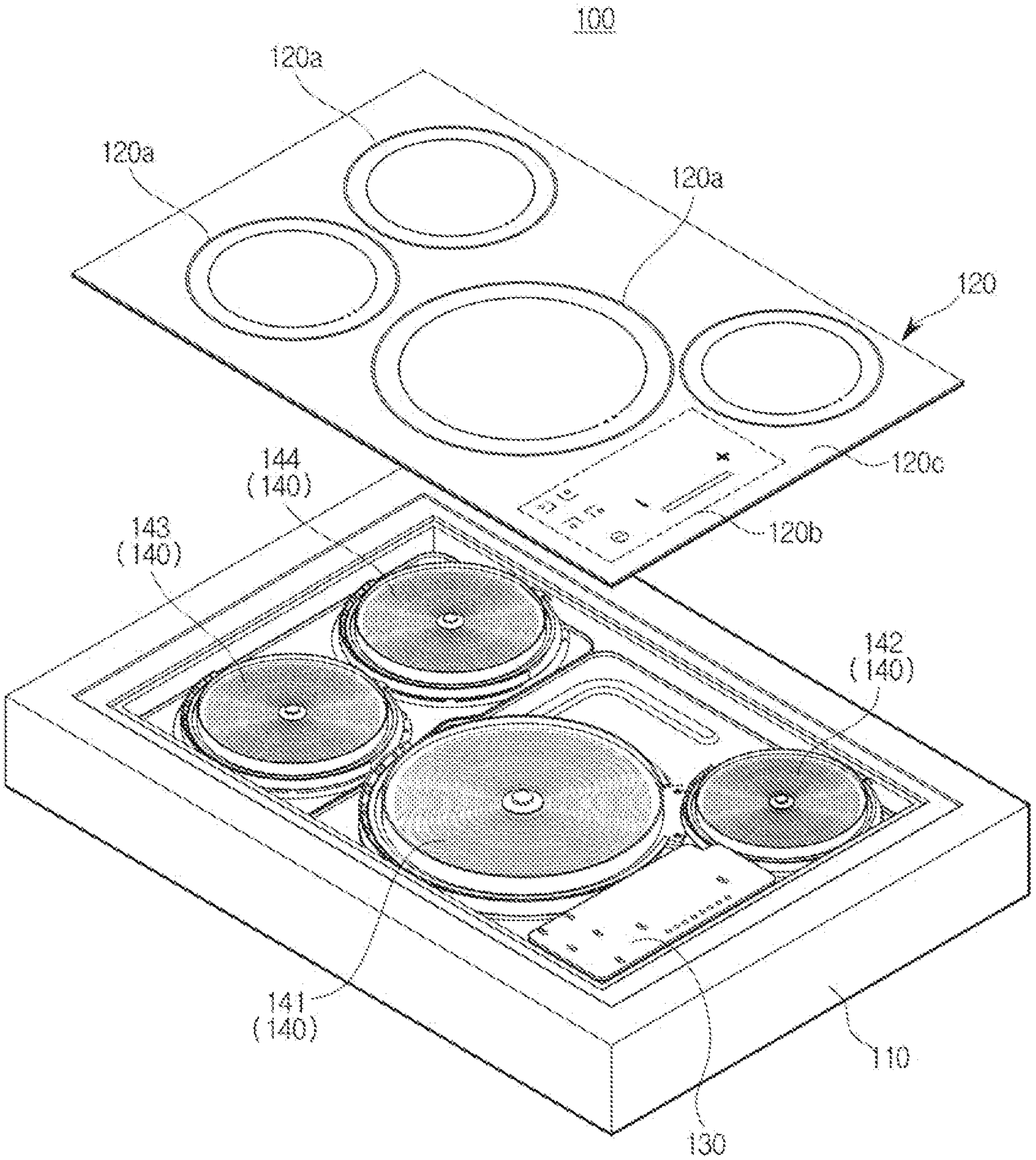
FIG. 2 is a view illustrating an interior of a cooking apparatus according to an embodiment.
Figure 3:
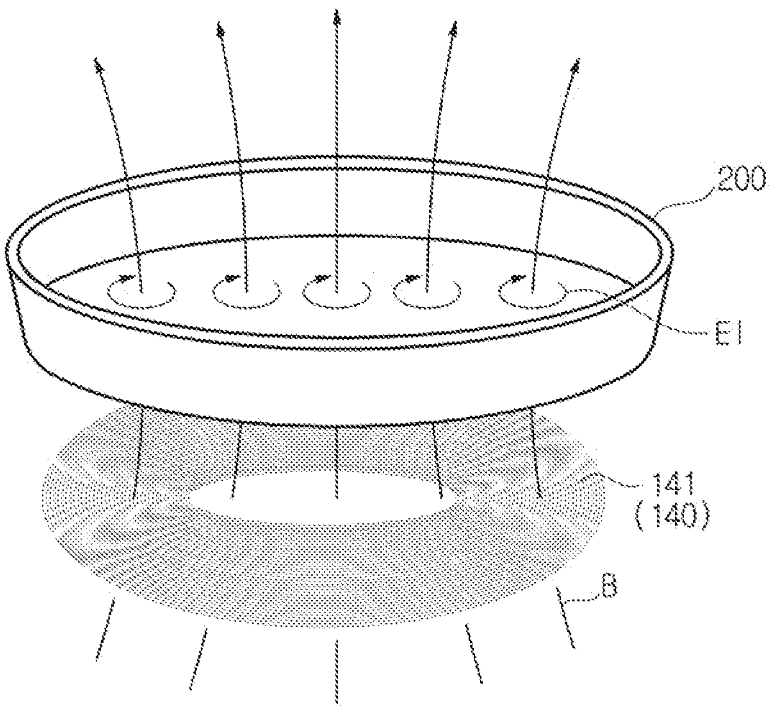
FIG. 3 is a view illustrating a principle of heating a vessel by a cooking apparatus according to an embodiment.

FIG. 1 is an external view of a cooking apparatus according to an embodiment, FIG. 2 is a view illustrating an interior of a cooking apparatus according to an embodiment, and FIG. 3 is a view illustrating a principle of heating a vessel by a cooking apparatus according to an embodiment.

Referring to FIG. 1, a cooking apparatus 100 may include a main body 110 which forms an exterior of the cooking apparatus 100 and is provided with various components constituting the cooking apparatus 100.

An upper surface of the main body 110 may be provided with a cooking plate 120 having a flat plate shape on which a cooking vessel may be placed.

The cooking plate 120 may be made of tempered glass such as ceramic glass so as not to be easily broken.

The cooking plate 120 may include a first area **120*a*, which corresponds to a position of at least one coil and is an area where the vessel is to be placed, a second area 120*b* in which an operation command of the cooking apparatus 100 is input and operation information is output, and a third area 120*c* which is an area excluding the first area 120*a* and the second area 120*b*** of the entire area.

Here, a coil position mark indicating a placing position of the vessel may be formed in the first area **120*a*, and an input/output position mark indicating an input/output position may be formed in the second area 120*b***.

As illustrated in FIG. 2, a user interface 130, a coil device 140, and a driving circuit 150 may be provided in a space that is a lower portion of the cooking plate 120 and is inside the main body 110.

The user interface 130 may include an inputter that receives the operation command from a user, and an outputter that outputs the operation information of the cooking apparatus.

The outputter may include at least one of a display that outputs the operation information as an optical light or an image, and a sound outputter that outputs the operation information as a sound.

The inputter of the user interface 130 may include a touch panel that recognizes a touch position. The display may include a display panel integrally provided with the touch panel.

That is, the user interface 130 may be provided as a touch screen in which the touch panel and the display panel are integrated, and the image of the touch screen may be projected to the outside through the second area **120*b* of the cooking plate 120**.

The inputter of the user interface 130 may include a plurality of touch pads for recognizing where to touch. The display may include at least one of a plurality of light emitting diodes and a plurality of seven segment displays.

The plurality of touch pads may receive a touch signal for power on/off, a touch signal for selecting the coil position, and a touch signal for selecting an output level.

Also, the inputter of the user interface 130 may be provided with at least one button, a switch, or at least one jog dial.

The plurality of light emitting diodes may be provided adjacent to the plurality of touch pads, and may display power on/off information, coil selection information, and coil output level information.

Here, light emitted from the plurality of light emitting diodes may be output to the outside through the second area **120*b* of the cooking plate 120**.

In addition, a symbol of the operation command indicating the input position of the operation command may be formed in the second area **120*b* of the cooking plate 120**, and a symbol of the operation information indicating the size of the output level may be formed.

For example, the symbol of the operation command may include a power on/off symbol and a position symbol of the coil, and the symbol of the operation information may include an increase/decrease symbol of the output level.

In addition, the user interface 130 may be provided at various positions, such as the front or side of the main body 110.

The coil device 140 may include a plurality of coils 141, 142, 143, and 144.

Here, the plurality of coils 141, 142, 143, and 144 may be provided in an interior space of the main body 110, but may be provided at a position corresponding to the coil position mark of the first area **120*a* of the cooking plate 120**.

The plurality of coils 141, 142, 143, and 144 of the coil device 140 may have the same size and number of windings.

In addition, the plurality of coils 141, 142, 143, and 144 of the coil device 140 may be different from each other in size and number of windings, and accordingly, a maximum output level may be different from each other.

In addition, the coil of the coil device 140 may be one.

Each coil of the coil device 140 may form a magnetic field when a current is supplied, so that the vessel is heated by the formed magnetic field.

This will be described in more detail with reference to FIG. 3.

Here, a principle of all coils heating the vessel is the same. Therefore, the principle of heating the vessel in the first coil 141 among the plurality of coils will be described.

As illustrated in FIG. 3, the first coil 141 may generate a magnetic field B passing through the inside of the coil according to Ampere's law when current is supplied to a wound wire.

At this time, the magnetic field B generated in the first coil 141 may pass through the bottom surface of a vessel 200.

The current applied to the first coil 141 is a current whose direction changes with time, that is, an alternating current.

Accordingly, the magnetic field generated in the first coil 141 may also change with time.

That is, when the magnetic field B that changes with time passes through the inside of the first coil 141, the current rotating around the magnetic field B may be generated inside the bottom surface of the vessel 200.

Here, the current rotating around the magnetic field is a current formed by a voltage generated in a direction to prevent a change in the magnetic field B of the first coil 141, and may be called an eddy current EI.

The bottom surface of the vessel 200 may be heated by the eddy current EI.

In other words, when the eddy current EI flows through the vessel 200 having electrical resistance, heat is generated according to Ohm's law, whereby the vessel 200 may be heated.

Here, a phenomenon in which the current is induced by the magnetic field B that changes with time may be called an electromagnetic induction phenomenon.

As described above, the cooking apparatus 100 may selectively supply the current to at least one of the plurality of coils 141, 142, 143, and 144, and may heat the vessel 200 using the magnetic field B generated by the at least one coil.

Here, the at least one coil supplying the current may be a coil selected by the user, or a coil disposed at the detected position after detecting the position where the vessel 200 is placed.

Figure 4:
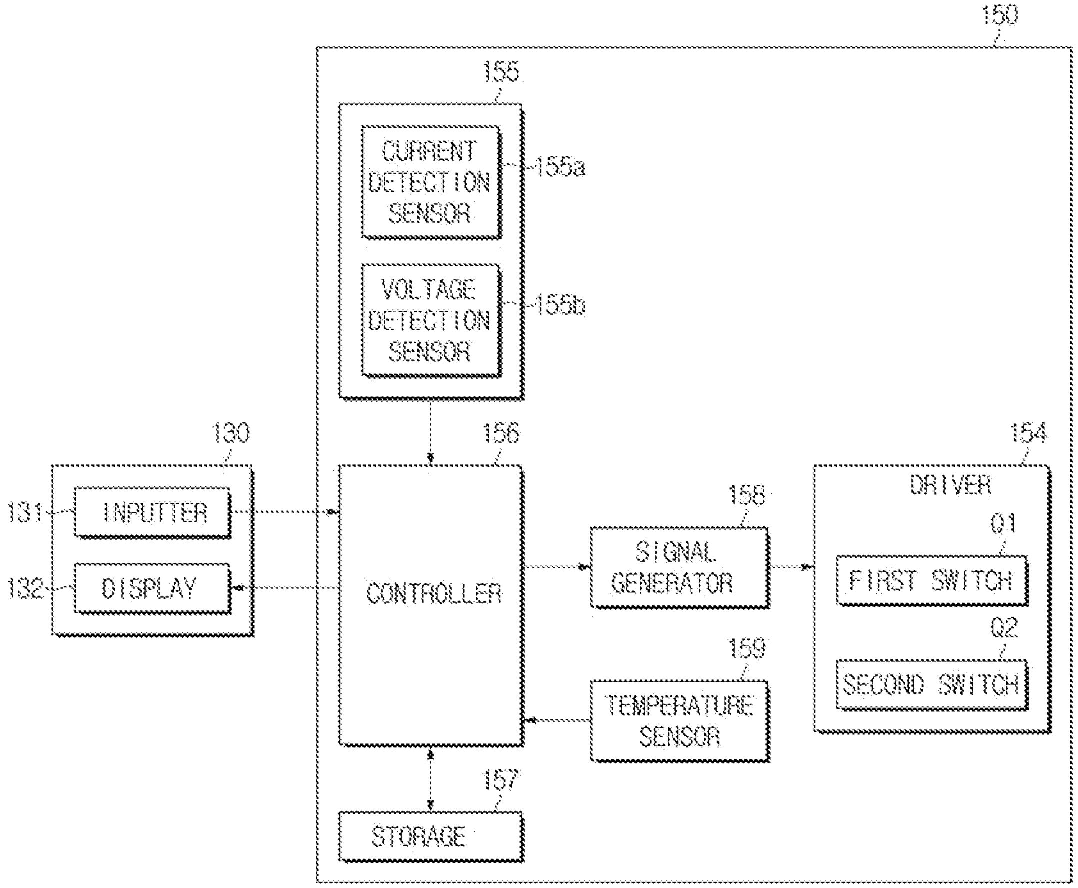
FIG. 4 is a control block diagram of a cooking apparatus according to an embodiment.
Figure 5:
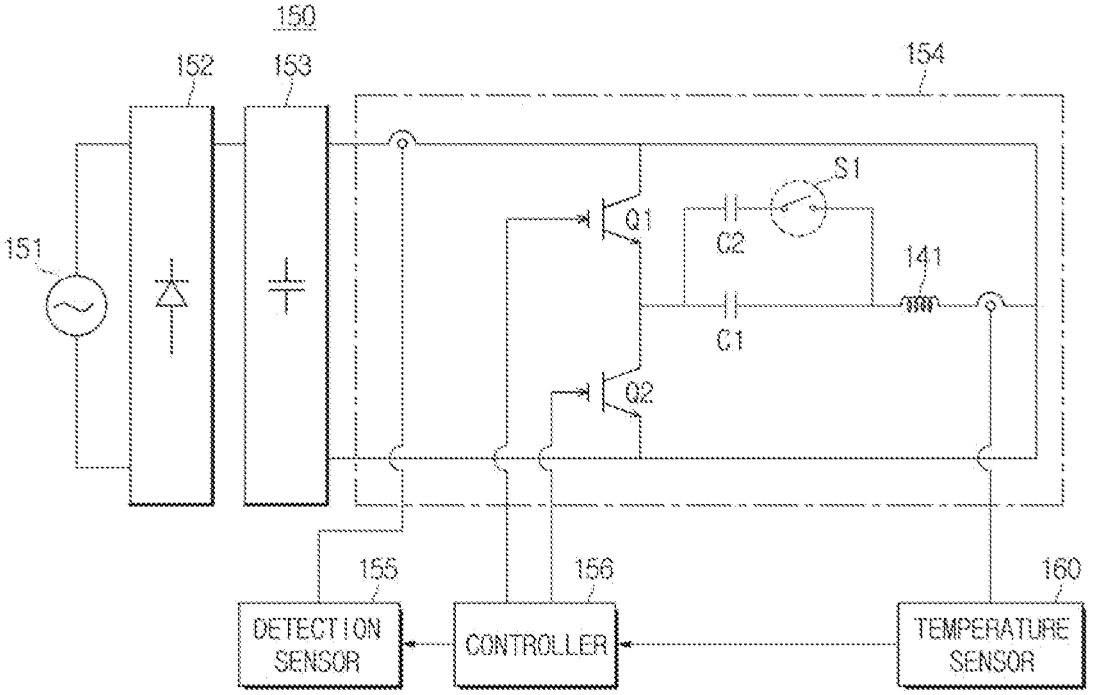
FIG. 5 is a view illustrating a detailed configuration of a driving circuit provided in a cooking apparatus according to an embodiment.
Figure 6:
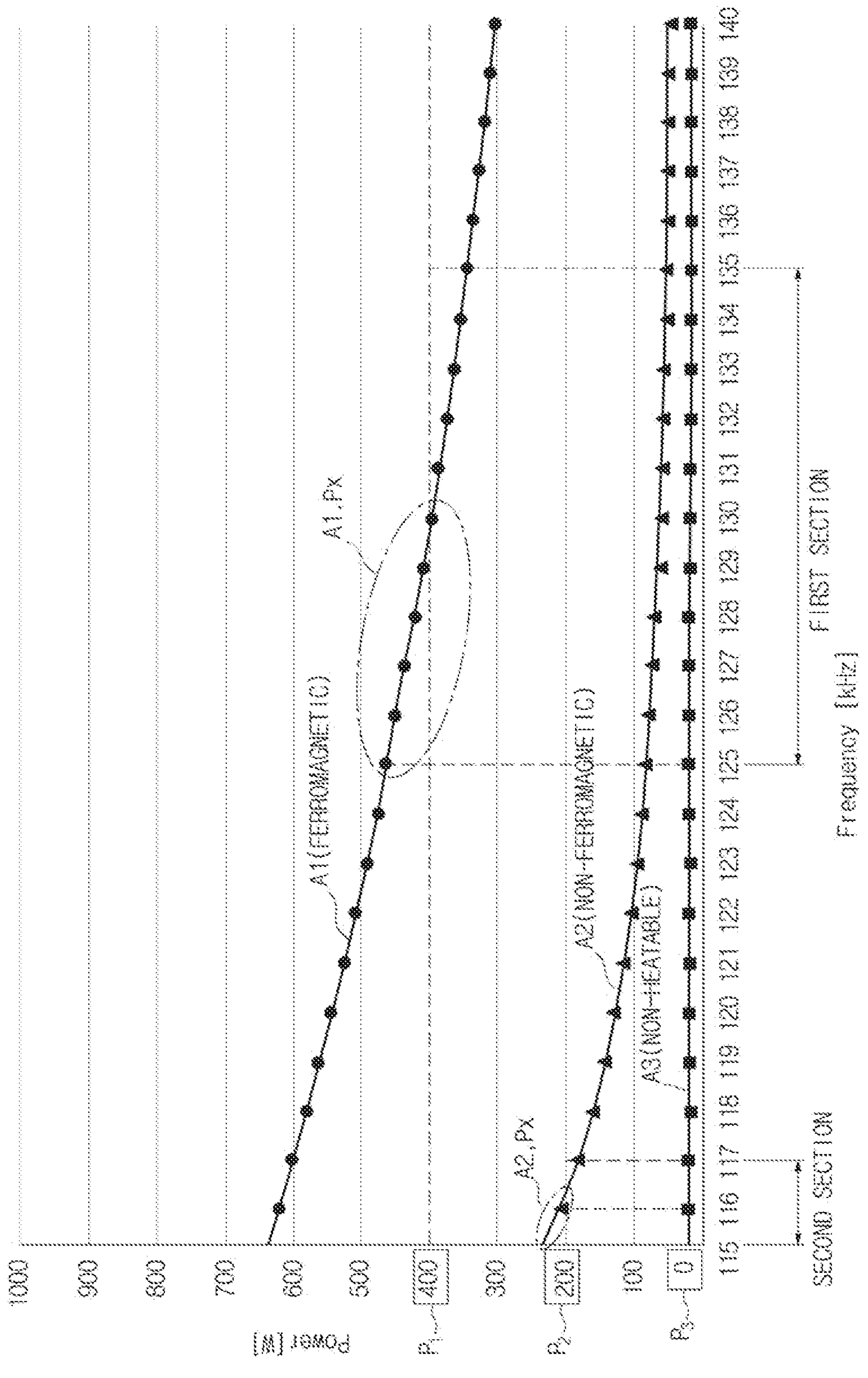
FIG. 6 is a power curve for determining the type of vessel placed on the cooking apparatus according to an embodiment.
Figure 7:
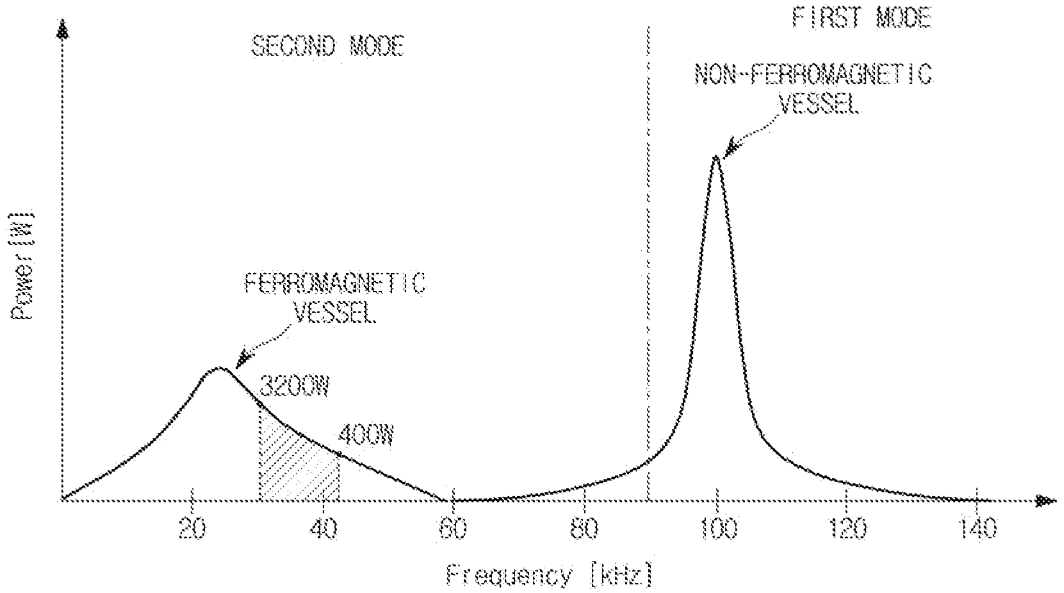
FIG. 7 is a heating mode curve of a cooking apparatus selected according to the type of vessel determined according to an embodiment.
Figure 8:
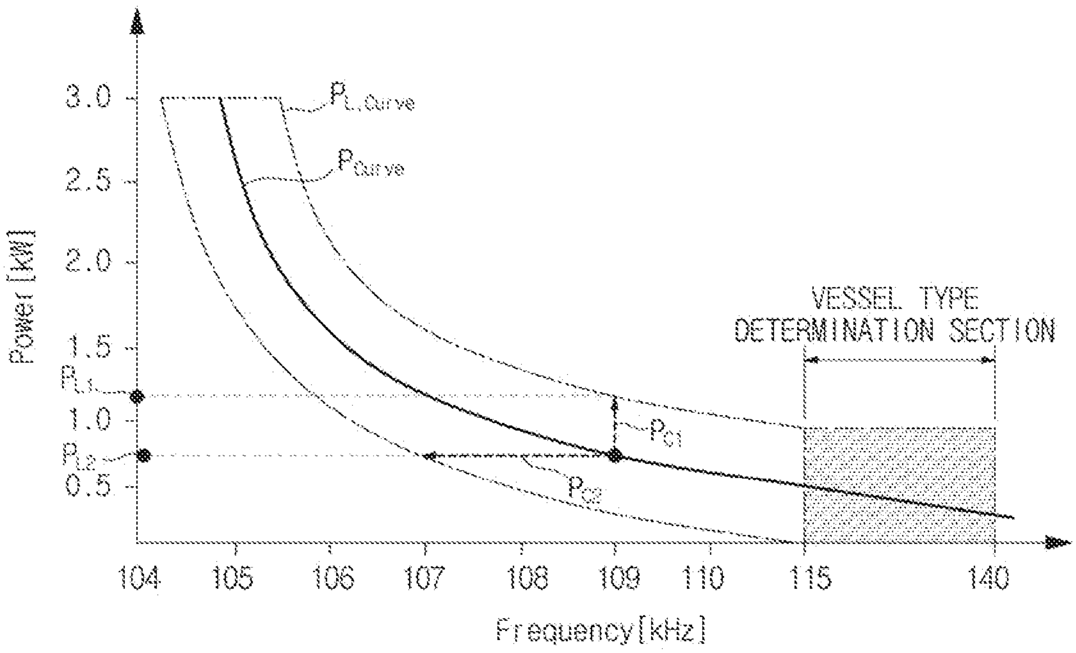
FIG. 8 illustrates a power curve of a power limit value for cutting off output power of a cooking apparatus according to an embodiment.
Figure 9:
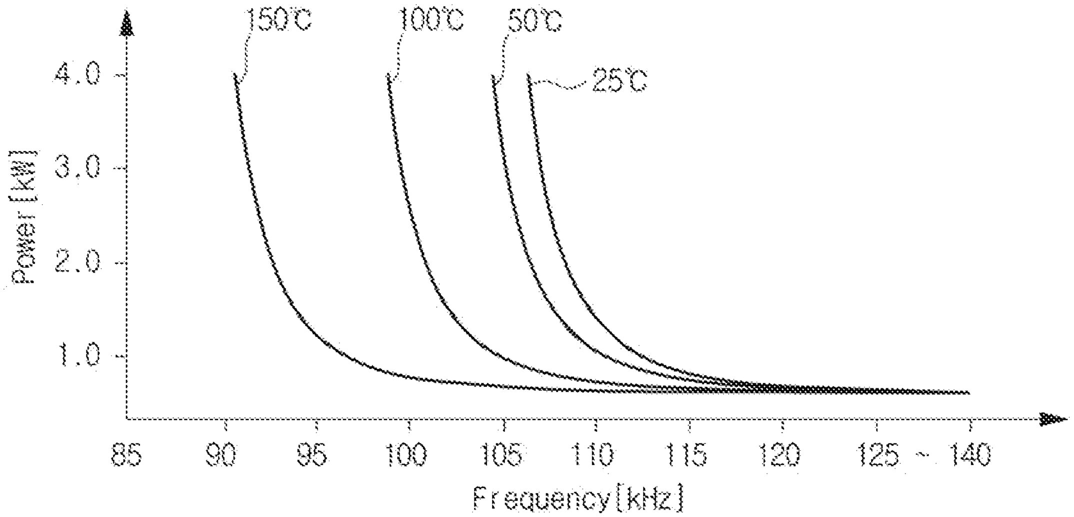
FIG. 9 illustrates output power that varies according to a temperature change of a coil according to an embodiment.
Figure 10:
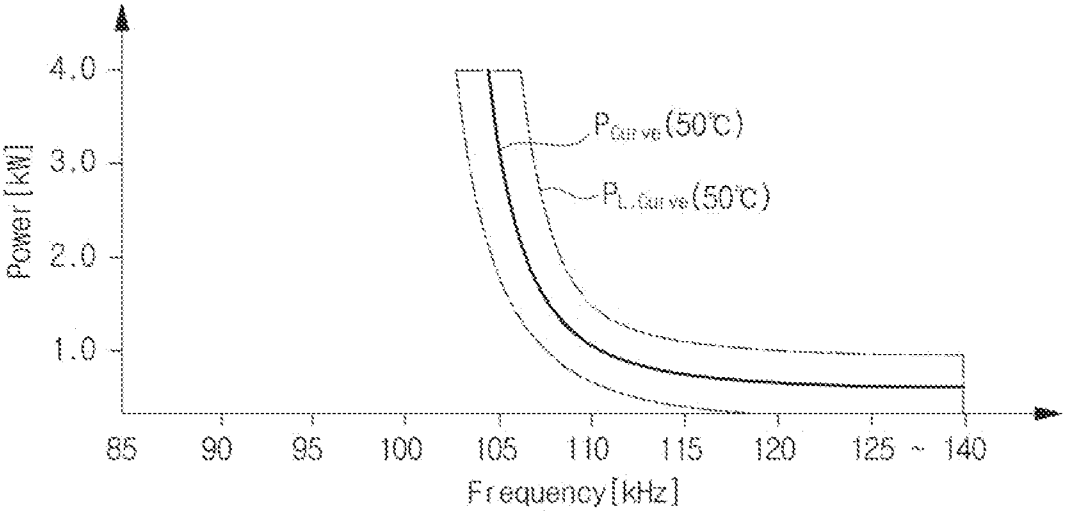
FIGS. 10 and 11 illustrate that a power limit value for cutting off output power of a cooking apparatus according to an embodiment varies according to a temperature change of a coil.
Figure 11:
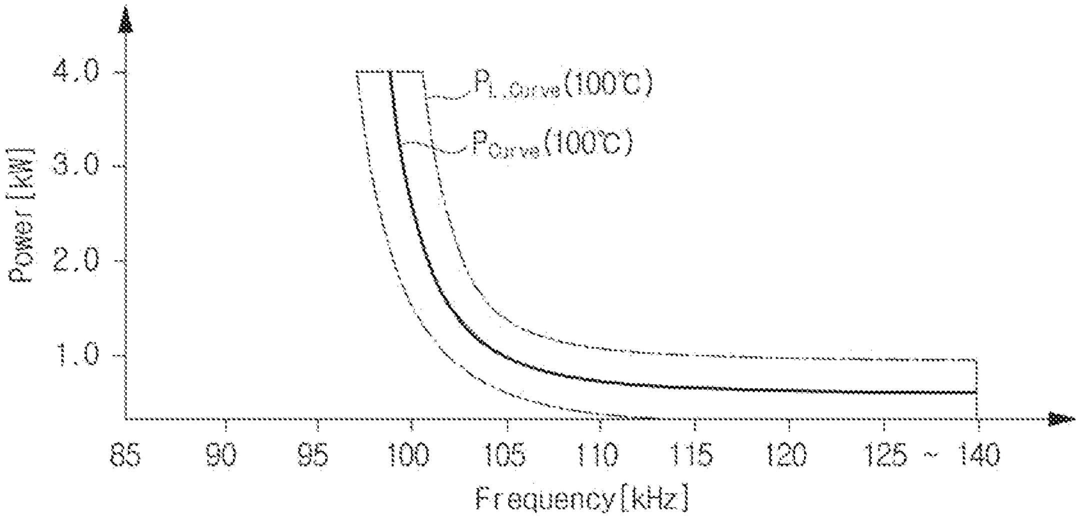

FIG. 4 is a control block diagram of a cooking apparatus according to an embodiment. FIG. 5 is a view illustrating a detailed configuration of a driving circuit provided in a cooking apparatus according to an embodiment. FIG. 6 is a power curve for determining the type of vessel placed on the cooking apparatus according to an embodiment. FIG. 7 is a heating mode curve of a cooking apparatus selected according to the type of vessel determined according to an embodiment. FIG. 8 illustrates a power curve of a power limit value for cutting off output power of a cooking apparatus according to an embodiment. FIG. 9 illustrates output power that varies according to a temperature change of a coil according to an embodiment. FIGS. 10 and 11 illustrate that a power limit value for cutting off output power of a cooking apparatus according to an embodiment varies according to a temperature change of a coil.

Referring to FIG. 4, the cooking apparatus 100 may include the user interface 130, the coil device 140, and the driving circuit 150.

The user interface 130 may include an inputter 131 receiving the operation command of the cooking apparatus 100 and a display 132 outputting the operation information of the cooking apparatus 100.

Here, the operation command may include the power on/off command, a coil selection command (that is, a cooking position selection command), a coil output level selection command, an operation start command, and an operation reservation command. The operation information may include the power on/off information, the coil selection information, the coil output level information, and cooking progress information.

When the driving circuit 150 is powered on and a position selection signal and an operation start signal of at least one coil are input, the current may be supplied to the selected at least one coil so that the vessel may be heated to a selected output level through the selected at least one coil.

The driving circuit 150 may adjust a magnitude of the current applied to the coil based on the selection signal of the output level of the coil.

Here, the output level is a discretely classification of an intensity of the magnetic field B generated by each of the coils 141, 142, 143, and 144, and the higher the output level, the greater the coil generates the magnetic field B, allowing the vessel 200 to be heated to a faster and higher temperature.

In addition, when the position selection signal of the coil is received, the driving circuit 150 may recognize a time at which the position selection signal of the coil is received as an operation start time, and may supply the current to the coil. When the selection signal of the output level is received, the driving circuit 150 may recognize a time at which the selection signal of the output level is received as the operation start time, and may supply the current to the coil.

The cooking apparatus 100 may further include a temperature sensor 160 provided around a plurality of coils, respectively. The temperature sensor 160 may detect the temperatures of a plurality of coils and transmit them to the controller 156. In this case, the driving circuit 150 may adjust the magnitude of the current applied to the coil based on the detected temperature.

The driving circuit 150 will be described with reference to FIG. 5.

Referring to FIG. 5, the driving circuit 150 may include a power supply 151, a rectifier 152, a smoother 153, a driver 154, a current detector 155, a controller 156, a storage 157 and temperature sensor 159.

The power supply 151 may be connected to an external commercial power source and receive power from the commercial power source.

The power supply 151 may include a power switch, and when a power-on signal is received through the inputter 131, the power supply 151 may turn on the power switch to be connected to the external commercial power source.

In addition, the power supply 151 may be transmitted to the rectifier 152 after removing noise of the external commercial power.

The rectifier 152 may receive power from the power supply 151 and rectify the power, and may transmit the rectified power to the smoother 153.

The rectifier 152 may include at least one diode, or may include a bridge diode.

The smoother 153 may remove a ripple of the rectified power from the rectifier 152 and transmit the power from which the ripple is removed to the driver 154.

That is, the smoother 153 may convert DC power by removing pulsation among the applied power and transmit the converted DC power to driving power of the driver 154.

When the power is supplied from the smoother 153, the driver 154 may supply the supplied power to at least one coil.

Here, the number of the drivers 154 may be the same as the number of coils.

For example, if there is one coil provided in the cooking apparatus 100, there is one of the drivers 154, and if there are four coils provided in the cooking apparatus 100, there are four of the drivers 154.

When there are a plurality of the drivers 154, the plurality of drivers 154 may be connected to the plurality of coils, respectively, and may supply the power to the coils connected to each of the plurality of drivers 154.

That is, the plurality of drivers 154 may operate independently of each other based on the position selection signal of the coil.

Since the configuration of the drivers 154 connected to each of the coils is the same, the embodiment describes the driver 154 connected to the first coil 141 as an example.

The driver 164 is connected between both terminals of the smoother 153 and includes a first switch Q1 and a second switch Q2 receiving an operation signal from the controller 156, and a first and second capacitors C1 and C2 connected between the terminals of the first switch Q1 and the second switch Q2 and the coil 141.

The first switch Q1 and the second switch Q2 each includes a gate terminal connected to the controller 156, and may be turned on by receiving a turn-on signal through the gate terminal or turned off by receiving a turn-off signal.

Here, the first switch Q1 and the second switch Q2 may be turned on alternately. That is, when the first switch Q1 is turned on, the second switch Q2 may be turned off, and when the first switch Q1 is turned off, the second switch Q2 may be turned on.

The driver 154 may be provided in a form of a half bridge.

The coil 141 may form a resonant circuit, and the current of the coil 141 resonates according to a predetermined period. The coil 141 generates a high-frequency magnetic field using the operating frequencies of the first switch Q1 and the second switch Q2.

The driver 154 may supply the current in which the direction changes to the coil 141 according to turn on and turn off operations of the first switch Q1 and the second switch Q2.

That is, when the first switch Q1 is turned on and the second switch Q2 is turned off, the driving current in a first direction may be supplied to the coil 141. When the first switch Q1 is turned off and the second switch Q2 is turned on, the driving current in the second direction may be supplied to the coil 141.

The detection sensor 155 may be provided at the input terminal of the driver 154 and may include a current detection sensor 155*a* and a voltage detection sensor 155*b*. The current detection sensor 155*a* may detect an input current input to the driver 154, and the voltage detection sensor 155*b* may detect an input voltage applied to the input terminal of the driver 154. The detection sensor 155 transmits information on the magnitude of the detected input current (DC-Link current) and the magnitude of the input voltage (DC-Link voltage) to the controller 156.

The driving circuit 150 may further include a gate driver (not shown) that generates a gate signal for turning on and off the first switch Q1 and the second switch Q2 according to the command of the controller 156. Here, the gate driver may be provided integrally with the controller 156 or separately from the controller 156.

In addition, when the gate driver is provided separately from the controller, the controller 156 may include a communication interface for communication with the gate driver.

A signal generator 158 may generate the operating frequencies for operating the first switch Q1 and the second switch Q2. In addition, the signal generator 158 may generate an increased operating frequency to a preset value under the control of the controller 156 and apply the increased operating frequency to the gate terminal of the first switch Q1 and the gate terminal of the second switch Q2.

When the selection signal of the output level and the position selection information of the coil are received, the controller 156 may transmit a control signal to the driver 154 to supply the current corresponding to the selected output level to the selected coil.

When the control signal is transmitted to the driver 154, the controller 156 may transmit the control signal for alternately controlling the turn-on operation of the first switch Q1 and the second switch Q2.

The controller 156 may change the periods of turn-on and turn-off of the first switch Q1 and the second switch Q2 to apply the current corresponding to the selected output level to the coil 141. The magnitude of the current supplied to the coil 141 may be changed.

Here, the periods of turn-on and turn-off of the first switch Q1 and the second switch Q2 may be determined according to the frequency. In addition, the controller 156 may control pulse width modulation (PWM) for turn-on and turn-off of the first and second switches Q1 and Q2 based on a temperature of the coil.

A vessel for heating may be placed on the coil 141 of the cooking apparatus 100.

As for the cooking vessel that may be used in the existing cooking apparatus 100, only vessels formed of ferromagnetic may be used, and vessels formed of non-ferromagnetic may not be used. Therefore, in order to increase the utility of the cooking apparatus 100, studies on the cooking apparatus 100 that may use not only ferromagnetic materials but also non-ferromagnetic vessels have been actively conducted.

In order to implement the cooking apparatus 100 in which all types of vessels may be used, the technology is needed to quickly determine the type of vessel placed in the coil of the cooking apparatus 100 and to determine whether the placed vessel is a heatable vessel or a non-heatable vessel.

Referring to FIG. 6, the cooking apparatus 100 may determine the type of vessel placed on the cooking apparatus 100 based on a power value of each frequency applied by the signal generator 158.

The cooking apparatus 100 may determine the type of vessel within a predetermined frequency range. This frequency range may be, for example, from 115 kHz to 140 kHz.

The cooking apparatus 100 has a characteristic that output power increases as the operating frequency gradually decreases and approaches the resonance frequency of the resonance network. Therefore, in a predetermined high frequency range, there is no fear that the device will be damaged according to the power value, so the type of vessel may be determined within the predetermined frequency range.

When the vessel is placed on the coil 141 of the cooking apparatus 100, the detection sensor 155 may detect the magnitude of an input current (DC-Link current) applied differently according to the type of vessel placed and the magnitude of an input voltage (DC-Link voltage) of the cooking apparatus 100.

The controller 156 may determine the type of vessel by comparing a power value (P=V*I) calculated based on the input current and input voltage detected by the detection sensor 155 with a predetermined power value.

As shown in FIG. 6, since the output power for each frequency of the cooking apparatus 100 is different according to the type of vessel, the type of vessel placed on the cooking apparatus 100 may be determined from the corresponding power value within a predetermined frequency range.

In the first section of the predetermined frequency range of the cooking apparatus 100, when the calculated power value includes a section (A1, px) greater than or equal to the first reference power value P1, the controller 156 may determine the type of vessel placed on the cooking apparatus 100 as a ferromagnetic vessel.

As shown in the ferromagnetic power curve A1 shown in FIG. 6, when the first section of the predetermined frequency range is 125 kHz to 135 kHz, and the first reference power value P1 for determining as a ferromagnetic vessel is 400 W, if the power value output from the first section includes a section (A1, px) that is greater than or equal to the first reference power value P1, the controller 156 may determine the type of the placed vessel as a ferromagnetic vessel.

In addition, in the second section of the predetermined frequency range of the cooking apparatus 100, when the calculated power value is greater than or equal to the second reference power value P2 and includes a section (A2, px) less than the first reference power value P1, the controller 156 may determine the type of vessel placed on the cooking apparatus 100 as a non-ferromagnetic vessel.

As shown in the non-ferromagnetic power curve A2 shown in FIG. 6, when the second section of the predetermined frequency range is 115 kHz to 117 kHz, and the second reference power value P2 for determining as a non-ferromagnetic vessel is 200 W, if the power value output from the second section is greater than or equal to the second reference power value P2 and includes a section (A2, px) less than the first reference power value P1, the controller 156 may determine the type of the placed vessel as a non-ferromagnetic vessel.

In addition, within the predetermined frequency range of the cooking apparatus 100, when the calculated power value is the third reference power value P3, the controller 156 may determine the type of vessel placed on the cooking apparatus 100 as a non-heatable vessel. In this case, the third reference power value P3 may be OW, for example, but may vary according to settings.

As shown in the power curve A3 for the non-heatable vessel shown in FIG. 6, when the output power value is the third reference power value P3 within the predetermined frequency range of the cooking apparatus 100, the controller 156 may determine the type of the placed vessel as a non-heatable vessel.

The frequency range for the controller 156 to determine the type of vessel placed on the cooking apparatus 100 and the first section and the second section within the frequency range may vary according to settings. In addition, the first reference power value P1, the second reference power value P2, and the third reference power value P3 may also vary.

That is, depending on whether the vessel placed on the coil 141 of the cooking apparatus 100 is ferromagnetic, non-ferromagnetic, or non-heatable, the magnitude of the current applied to the cooking apparatus 100 varies, and as a result, the power output from the cooking apparatus 100 is different. Accordingly, the controller 156 may determine the type of vessel placed on the cooking apparatus 100 based on the power difference for each frequency.

As shown in FIG. 6, the frequency range corresponding to the first section and the second section of the predetermined frequency range for the controller 156 to determine the type of vessel placed on the cooking apparatus 100 may vary according to settings.

In addition, the magnitudes of the first reference power value P1, second reference power value P2, and third reference power value P3, which are the reference for determining the output power for each frequency that varies according to the type of vessel, may also vary according to the setting.

Referring to FIG. 7, the controller 156 may determine the heating mode of the cooking apparatus 100 based on the type of vessel determined as described above. That is, when the type of vessel placed on the cooking apparatus 100 is a non-ferromagnetic vessel, the controller 156 may determine the heating mode of the cooking apparatus 100 as the first mode, and when the type of vessel is a ferromagnetic vessel, the controller 156 may determine the heating mode of the cooking apparatus 100 as the second mode.

As described above, since the cooking apparatus 100 operates differently in the heating mode according to the type of placed vessel, the cooking apparatus 100 quickly determines the type of vessel and implements different operation modes according to the determined type of the vessel.

As shown in FIG. 7, the operating frequency at which the cooking apparatus 100 operates may be different depending on the type of vessel. That is, when the type of vessel is non-ferromagnetic, power is output to operate at a higher frequency than when the type of vessel is ferromagnetic. Therefore, the cooking apparatus 100 should select a heating mode according to the type of vessel.

Referring to FIG. 5, the driver 154 may further include a relay switch S1, and a heating mode of the cooking apparatus 100 may be selected according to on/off of the relay switch S1.

When the heating mode of the cooking apparatus 100 is determined as the first mode, the controller 156 may control the relay switch S1 to be turned off, and when the heating mode of the cooking apparatus 100 is determined as the second mode, the controller 156 may control the relay switch S1 to be turned on.

That is, when the relay switch S1 is maintained in a turn-off state in the driver 154, and the controller 156 determines the type of vessel placed on the cooking apparatus 100 as non-ferromagnetic, the controller 156 controls the heating mode of the cooking apparatus 100 as a first mode by controlling the relay switch S1 to be maintained in the turn-off state. On the other hand, when the type of vessel placed on the cooking apparatus 100 is determined as ferromagnetic, the controller 156 controls the heating mode of the cooking apparatus 100 as a second mode by controlling the relay switch S1 to be turned on.

Referring to FIG. 8, when a heating operation is performed on a vessel placed on the cooking apparatus 100, as the operating frequency of the cooking apparatus 100 decreases, the operating frequency approaches the resonant frequency of the resonant network, and thus the output power increases.

A curve for the output power for each frequency ($P_{curve}$) may be displayed as shown FIG. 8. When a vessel is placed on the cooking apparatus 100 and a heating operation is performed, the cooking apparatus 100 may maintain the frequency so that the set power is maintained on the corresponding power curve ($P_{curve}$) in order to perform the heating operation with a preset output power.

During the heating operation of the cooking apparatus 100, when the placed vessel moves out of the coil, or the type of vessel is changed, or a foreign substance is inserted between the coil and the vessel, thereby changing the output power of the cooking apparatus 100, the controller 156 may cut off the heating operation of the cooking apparatus 100.

When setting the power limit value to cut off the power of the cooking apparatus 100, the conventional cooking apparatus 100 set a specific value as a power limit value, regardless of the shape of a curve ($P_{curve}$) for output power of each frequency. Therefore, when a change in load such as a vessel placed on the cooking apparatus 100 occurs, there is a problem in that a certain time is required until the power is cut off.

According to the cooking apparatus 100 and a control method thereof according to an embodiment of the disclosure, when the output power of the cooking apparatus 100 changes as the state of the vessel placed on the cooking apparatus 100 changes, the output power of the cooking apparatus 100 may be controlled according to a power curve control algorithm using the Curve-Fitting Method (CFM).

As shown in FIG. 8, this Curve-Fitting Method (CFM) derives a third-order polynomial by curve-fitting the power curve ($P_{curve}$) during induction heating of the vessel of the cooking apparatus 100. And Curve-Fitting Method (CFM) is a control method capable of operating sensitively to the fluctuation of load parameters placed on the cooking apparatus 100 by monitoring power for each frequency by applying an equation derived on a software code.

The power limit value based on the CFM power control algorithm may be previously stored in the storage 157.

As shown in FIG. 8, in the power limit value stored in the storage 157, a set of preset power limit values may be stored in the form of a curve ($P_{L,curve}$) in response to the output power curve ($P_{curve}$) for each frequency of the cooking apparatus 100. That is, the storage 157 may store data on a power limit value that increases based on a power curve as the frequency of the cooking apparatus 100 decreases.

As described above, when the state of the vessel is changed while the cooking apparatus 100 is heating the placed vessel, the output power of the cooking apparatus 100 is changed. That is, when the output power when the vessel is currently being heated by being placed on the cooking apparatus 100 in FIG. 8 is $P_{L2}$, the controller 156 may control the heating operation to be performed with the output power of $P_{L2}$ when the frequency of the cooking apparatus 100 is 109 kHz.

That is, the controller 100 controls the output power of the cooking apparatus 100 to be maintained on an output power curve ($P_{curve}$) for each frequency of the cooking apparatus 100. Therefore, the controller 100 maintains output power by varying the frequency of the cooking apparatus 100 when the state of the vessel is changed.

Therefore, since the frequency is continuously variable according to the state change of the vessel placed on the cooking apparatus 100, the output power of the cooking apparatus 100 may exceed the preset power limit value. In order to prevent this, the controller 156 may reset the heating operation of the cooking apparatus 100 when the output power of the cooking apparatus 100 reaches a preset power limit value.

As shown in FIG. 8, when the current output power of the cooking apparatus 100 is PL2, the output power of the cooking apparatus 100 may be changed to the path of PC1 or PC2 by deviating from the position where the vessel is placed, changing the type of the vessel, or inserting a foreign substance between the vessel and the coil.

When the output power of the cooking apparatus 100 reaches the power limit values $P_{L1}$, $P_{L2}$ set by CFM, or the frequency of the cooking apparatus 100 reaches the limit frequency, the controller 156 may cut off the power of the cooking apparatus 100 in order to reset the heating operation of the cooking apparatus 100 and proceed with a step of determining the type of vessel placed on the cooking apparatus 100.

As shown in FIG. 9, when the vessel placed on the cooking apparatus 100 is heated, the temperature of the coil 141 changes. That is, as the placed vessel is heated, the temperature of the coil 141 may increase due to radiant heat returned from the vessel.

When the temperature of the coil 141 is changed, the output power curve of the cooking apparatus 100 is also changed as shown in FIG. 9. When the temperature of the coil 141 increases, a lower frequency is required for the cooking apparatus 100 to output the same amount of power.

The temperature sensor 160 may detect the changed temperature of the coil 141 and transmit it to the controller 156, and the storage 157 may store a power limit value of the cooking apparatus 100 that varies according to the temperature of the coil 141.

That is, the storage 157 may store a set of preset power limit values as the form of a curve ($P_{L,\ curve}$) as described above in FIG. 8.

For example, as shown in FIG. 10, when the temperature of the coil 141 is 50° C., a set of preset power limit values may be stored in the form of a curve ($P_{L,\ curve}$(50° C.)) corresponding to the output power curve for each frequency of the cooking apparatus 100. That is, when the temperature of the coil 141 is 50° C., the storage 157 may store data on a power limit value that increases based on a power curve as the frequency of the cooking apparatus 100 decreases.

Similarly, when the temperature of the coil 141 is 100° C. as shown in FIG. 11, a set of preset power limit values corresponding to the output power curve for each frequency of the cooking apparatus 100 may be stored in the form of a curve ($P_{L,\ curve}$(100° C.)). That is, when the temperature of the coil 141 is 100° C., the storage 157 may store data on a power limit value that increases based on the power curve as the frequency of the cooking apparatus 100 decreases.

Based on the power limit value of the cooking apparatus 100 that changes as the temperature of the coil 141 is changed, when the output power of the cooking apparatus 100, which changes according to the change of the vessel state, reaches the power limit value stored in the storage 157, the controller 156 may reset the heating operation of the cooking apparatus.

As described above in FIG. 8, when the output power of the cooking apparatus 100 is changed as the state of the vessel placed on the cooking apparatus 100 is changed, the output power of the cooking apparatus 100 is controlled according to the power curve control algorithm using CFM. At this time, the output power curve ($P_{curve}$) for each frequency of the cooking apparatus 100 is also changed according to the temperature of the coil 141.

Accordingly, the storage 157 may store data ($P_{L,\ curve}$) of preset power limit values differently in response to an output power curve that varies for each temperature ($P_{curve}$) of the coil 141.

When the output power of the cooking apparatus 100 reaches the power limit value based on the power limit value of the cooking apparatus 100 for each temperature of the coil 141 stored in the storage 157, the controller 156 may cut off the power of the cooking apparatus 100 in order to reset the heating operation of the cooking apparatus 100 and proceed with a step of determining the type of vessel placed on the cooking apparatus 100.

That is, as the vessel placed on the cooking apparatus 100 is heated, when the temperature of the coil 141 increases, the output power for each frequency of the cooking apparatus 100 is also changed. Accordingly, the output power limit value of the cooking apparatus 100 may be stored in the storage 157 as a changed value corresponding thereto. The controller 156 may cut off the power of the cooking apparatus 100 and reset the heating operation of the cooking apparatus 100 based on the output power limit value changed according to the temperature of the coil 141.

Figure 12A:
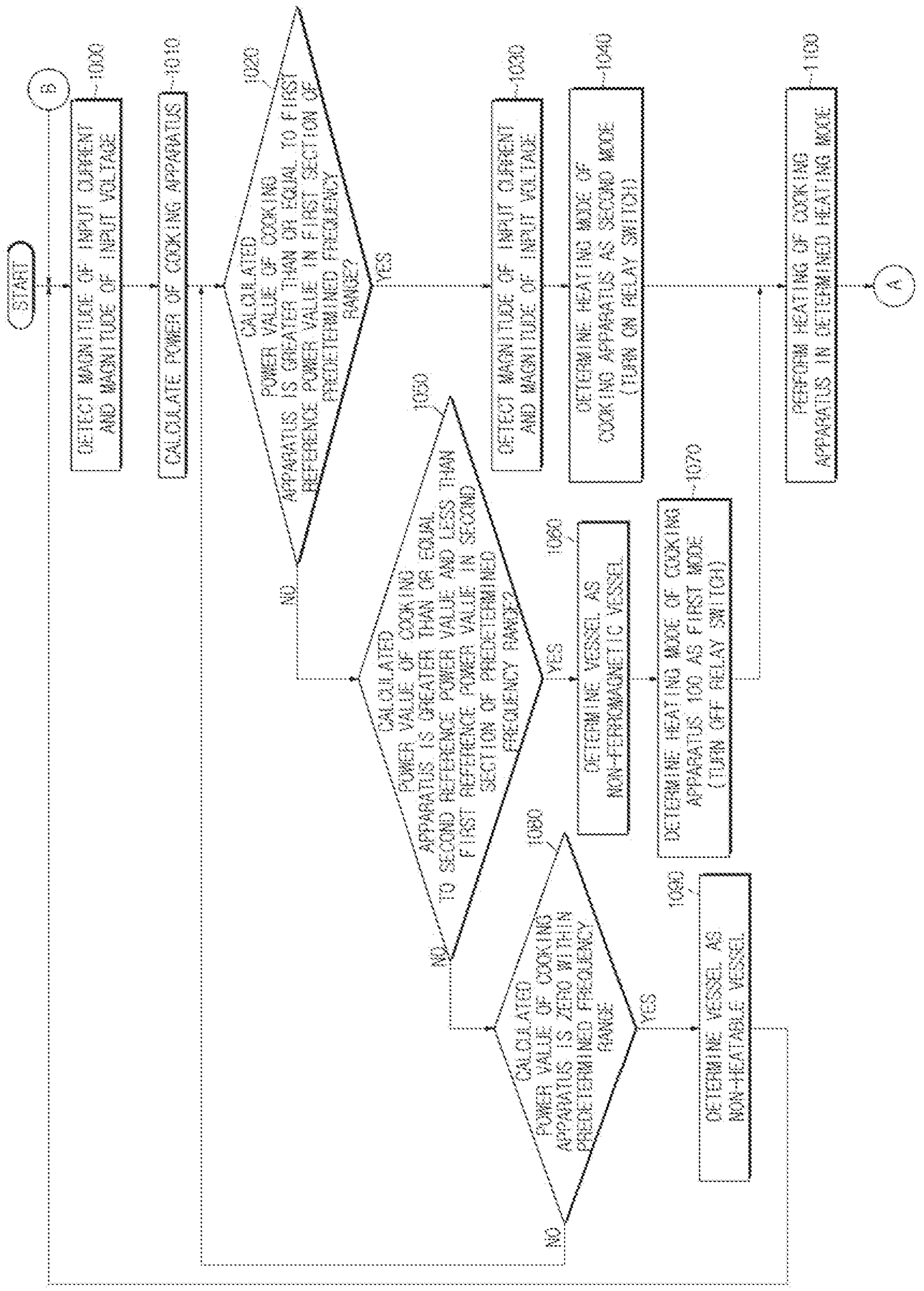
FIGS. 12A and 12B are flowcharts illustrating a control method of a cooking apparatus according to an embodiment.
Figure 12B:
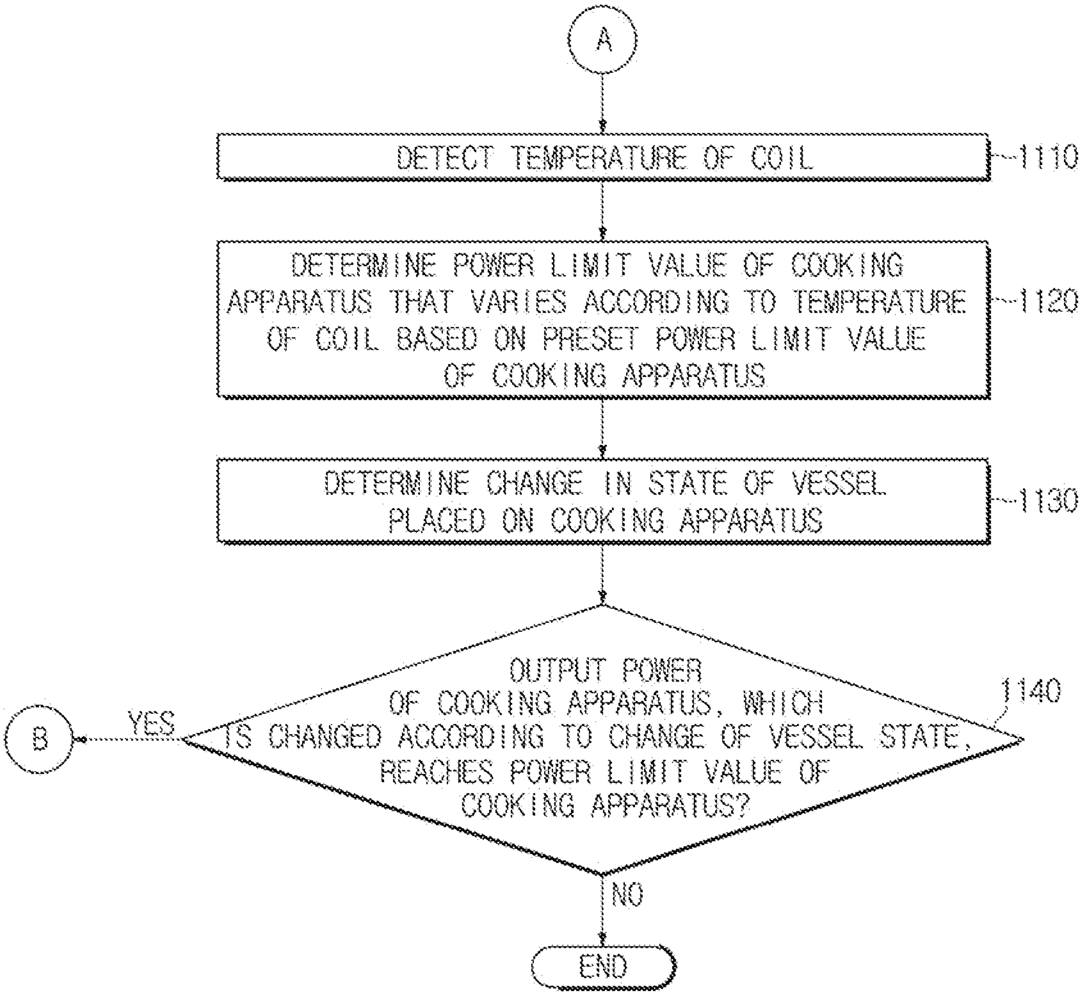

FIGS. 12A and 12B are flowcharts illustrating a control method of a cooking apparatus according to an embodiment.

Referring to FIGS. 12A and 12B, the detection sensor 155 may detect the magnitude of the input current and the input voltage of the cooking apparatus 100 (1000). Specifically, the current detection sensor 155*a* may detect the magnitude of the input current differently applied to the driver 154 according to the type of vessel placed on the cooking apparatus 100, and the voltage detection sensor 155*b* may detect an input voltage applied to the input terminal of the driver 154. The detection sensor 155 may transmit data on the detected input current (DC-Link current) and the input voltage (DC-Link voltage) to the controller 156.

The controller 156 may calculate the power of the cooking apparatus 100 based on the input current and input voltage detected by the detection sensor 155 (1010). As described above in FIG. 6, since the output power for each frequency of the cooking apparatus 100 is different according to the type of vessel placed on the cooking apparatus 100, the type of vessel placed on the cooking apparatus 100 may be determined from the corresponding power value within a predetermined frequency range.

Specifically, the controller 156 may determine whether the power value of the cooking apparatus 100 includes a section having a first reference power value or more in the first section of the predetermined frequency range of the cooking apparatus 100 (1020). And as a result of the determination, when the section is included, the controller 156 may determine a vessel placed on the cooking apparatus 100 as a ferromagnetic vessel (1030).

In addition, the controller 156 may determine whether the power value of the cooking apparatus 100 includes a section that is greater than or equal to the second reference power value and less than the first reference power value in the second section of the predetermined frequency range of the cooking apparatus 100 (1050). As a result of the determination, when the section is included, controller 156 may determine a vessel placed on the cooking apparatus 100 as a non-ferromagnetic vessel (1060).

In addition, the controller 156 may determine whether the power value of the cooking apparatus 100 is a third reference power value within a predetermined frequency range of the cooking apparatus 100 (1080). As a result of the determination, when the power value output from the cooking apparatus 100 is the third reference power value P3, the controller 156 may determine the placed vessel as a non-heatable vessel (1090).

The controller 156 may determine the heating mode of the cooking apparatus 100 based on the determined type of vessel. That is, when the type of vessel placed on the cooking apparatus 100 is a ferromagnetic vessel, the controller 156 may determine the heating mode of the cooking apparatus 100 as the second mode (1040). And, when the type of vessel is a non-ferromagnetic vessel, the controller 156 may determine the heating mode of the cooking apparatus 100 as the first mode (1070).

When the heating mode of the cooking apparatus 100 is determined as the first mode, the controller 156 may control the relay switch S1 to be turned off, and when the heating mode of the cooking apparatus 100 is determined as the second mode, the controller 156 may control the relay switch S1 to be turned on.

Since the cooking apparatus 100 operates differently in the heating mode according to the type of vessel placed, the controller 156 may quickly determine the type of vessel and may perform heating of the cooking apparatus 100 in a heating mode determined according to the determined type of vessel (1100).

While the cooking apparatus 100 is heating the placed vessel, the temperature sensor 159 may detect the temperature of the coil 141 (1110).

When the vessel placed on the cooking apparatus 100 is heated, the temperature of the coil 141 is changed, so the temperature sensor 160 may detect the changed temperature of the coil 141 and transmit it to the controller 156.

The controller 156 may determine a power limit value of the cooking apparatus 100 that varies according to the temperature of the coil 141 based on the power limit value of the cooking apparatus 100 previously stored in the storage 157 (1120).

The controller 156 may determine a change in the state of the vessel placed on the cooking apparatus 100 (1130). When the output power of the cooking apparatus 100, which is changed according to the change of the vessel state, reaches the power limit value of the cooking apparatus 100 (1140), the controller 156 may reset the heating operation of the cooking apparatus.

That is, while the cooking apparatus 100 is heating the placed vessel, when the vessel moves out of the position where the vessel is placed, the type of the placed vessel is changed, or a foreign substance is inserted between the vessel and the coil 141, and thereby the state of the vessel is changed, the controller 156 may determine whether the output power of the cooking apparatus 100, which varies accordingly, has reached a predetermined power limit value, cut off the power of the cooking apparatus 100 to reset the heating operation of the cooking apparatus 100 and proceed with the step of determining the type of vessel placed on the cooking apparatus 100.

The controller 156 may be a memory (not shown) that stores data for an algorithm for controlling the operation of the components in the cooking apparatus 100 or a program that reproduces the algorithm, and a processor (not shown) that performs the above-described operation using the data stored in the memory. At this time, the memory and the processor may be implemented as separate chips, respectively. Alternatively, the memory and the processor may be implemented as a single chip.

The storage 157 may be implemented using at least one of a non-volatile memory element, e.g., cache, Read Only Memory (ROM), Programmable ROM (PROM), Erasable Programmable ROM (EPROM), Electrically Erasable Programmable ROM (EEPROM) and flash memory; a volatile memory element, e.g., Random Access Memory (RAM); or a storage medium, e.g., a Hard Disk Drive (HDD) and CD-ROM. The implementation of the storage is not limited thereto. The storage 157 may be a memory that is implemented by a separate memory chip from the aforementioned processor related to the controller 156 or the storage may be implemented by a single chip with the processor.

As described above, according to the cooking apparatus and control method thereof according to an embodiment of the disclosure, it is possible to quickly determine the type of vessel placed on the cooking apparatus, and to implement a power control algorithm having a fast response in response to changes in the state of placed vessels or changes in temperature of the coil.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be read only memory (ROM), random access memory (RAM), a magnetic tape, a magnetic disc, flash memory, an optical data storage device, etc.

Although the present disclosure has been described with various embodiments, various changes and modifications may be suggested to one skilled in the art. It is intended that the present disclosure encompass such changes and modifications fall within the scope of the appended claims.

The invention claimed is:

1. A cooking apparatus comprising:

a coil on which a vessel is placeable, and configured to form a magnetic field upon application of a current;

a first switch and a second switch connected to the coil and serially connected to each other;

a first capacitor and a second capacitor connected between one end of the first switch and the second switch and the coil, and connected in parallel to each other;

a relay switch connected to one end of the second capacitor;

a detection sensor configured to detect a magnitude of an input current applied differently according to a type of the vessel and a magnitude of an input voltage of the cooking apparatus; and a controller configured to determine a type of the vessel placed on the coil according to a power value calculated based on the detected input current and input voltage, and determine a heating mode of the cooking apparatus based on the determined type of vessel, wherein the controller is configured to:

determine the heating mode as a first mode for turning off the relay switch based on the determination that the type of the vessel placed on the coil is a non-ferromagnetic vessel, and determine the heating mode as a second mode for turning on the relay switch based on the determination that the type of the vessel placed on the coil is a non-ferromagnetic vessel.

2. The cooking apparatus according to claim 1, wherein the controller is configured to determine a type of the placed vessel by comparing the calculated power value with a predetermined power value within a predetermined frequency range of the cooking apparatus.

3. The cooking apparatus according to claim 2, wherein the controller is configured to determine a type of the placed vessel as the ferromagnetic vessel in response to the calculated power value being greater than or equal to a first reference power value in a first section of the predetermined frequency range, determine a type of the placed vessel as the non-ferromagnetic vessel in response to the calculated power value being greater than or equal to the second reference power value and less than the first reference power value in a second section of the predetermined frequency range, and determine a type of the placed vessel as the non-heatable vessel in response to the calculated power value being the third reference power value within the predetermined frequency range.

4. A cooking apparatus comprising:

a coil on which a vessel is placed, configured to form a magnetic field upon application of a current;

a temperature sensor configured to detect a temperature of the coil;

a storage configured to store a power limit value of the cooking apparatus that varies depending on the temperature of the coil in response to heating the placed vessel; and a controller configured to reset a heating operation of the cooking apparatus in response to the output power of the cooking apparatus, which is changed as the state of the vessel changes, reaching the power limit value of the cooking device that varies depending on the temperature of the coil.

5. The cooking apparatus according to claim 4, wherein the controller is configured to reset the heating operation of the cooking apparatus in response to the output power of the cooking apparatus, which is changed by deviating from the position where the vessel is placed, by changing the type of the vessel, or by inserting a foreign substance between the vessel and the coil, reaching the preset power limit value.

6. The cooking apparatus according to claim 4, wherein the power limit value corresponds to the output power curve of each frequency of the cooking apparatus, and the power limit value increases based on the power curve as the frequency of the cooking apparatus decreases.

7. The cooking apparatus according to claim 4, wherein the controller is configured to cut off the power of the cooking apparatus to reset the heating operation of the cooking apparatus and determine a type of the vessel in response to the output power of the cooking apparatus, which is changed as the state of the vessel changes, reaching the power limit value.

8. A control method of a cooking apparatus on which a vessel is placed, the method comprising:

detecting a magnitude of an input current applied differently according to a type of the vessel and a magnitude of an input voltage of the cooking apparatus;

determining a type of the vessel placed on the coil according to a power value calculated based on the detected input current and input voltage; and determining a heating mode of the cooking apparatus based on the determined type of vessel, wherein the cooking apparatus includes:

a coil on which the vessel is placed, and configured to form a magnetic field upon application of a current, a first switch and a second switch connected to the coil and serially connected to each other, a first capacitor and a second capacitor connected between one end of the first switch and the second switch and the coil, and connected in parallel to each other, and a relay switch connected to one end of the second capacitor, and the determining a heating mode includes:

determining the heating mode as a first mode for turning off the relay switch based on the determination that the type of the vessel placed on the coil is a non-ferromagnetic cell, and determining the heating mode as a second mode for turning on the relay switch based on the determination that the type of the vessel placed on the coil is a non-ferromagnetic vessel.

9. The control method according to claim 8, wherein the determining the type of the placed vessel comprises:

determining a type of the placed vessel by comparing the calculated power value with a predetermined power value within a predetermined frequency range of the cooking apparatus.

10. The control method according to claim 9, wherein the determining the type of the placed vessel includes:

determining a type of the placed vessel as the ferromagnetic vessel in response to the calculated power value being greater than or equal to a first reference power value in a first section of the predetermined frequency range;

determining a type of the placed vessel as the non-ferromagnetic vessel in response to the calculated power value being greater than or equal to the second reference power value and less than the first reference power value in a second section of the predetermined frequency range; and determining a type of the placed vessel as a non-heatable vessel in response to the calculated power value being the third reference power value within the predetermined frequency range.

11. A control method of a cooking apparatus comprising a coil on which a vessel is placeable, configured to form a magnetic field upon application of a current, the method comprising:

storing a power limit value of the apparatus that varies depending on a temperature of the coil;

detecting the temperature of the coil which is changed as the vessel placed on the coil is heated; and resetting a heating operation of the cooking apparatus in response to the output power of the cooking apparatus, which is changed as the state of the vessel changes, reaching the stored power limit value of the cooking device that varies depending on the temperature of the coil.

12. The control method according to claim 11, wherein the resetting the heating operation of the cooking apparatus comprises:

resetting the heating operation of the cooking apparatus in response to the output power of the cooking apparatus, which is changed by deviating from the position where the vessel is placed, by changing the type of the vessel, or by inserting a foreign substance between the vessel and the coil, reaching the power limit value.

13. The control method according to claim 11, wherein the power limit value corresponds to the output power curve of each frequency of the cooking apparatus; and increases based on the power curve as the frequency of the cooking apparatus decreases.

* * * * *